UNITED STATES PATENT OFFICE

KAZIMIERZ BARANOWSKI, OF PARIS, FRANCE, ASSIGNOR, BY MESNE ASSIGNMENTS, TO EINSTEIN'S ELECTRO CHEMICAL PROCESS LIMITED, OF LONDON, ENGLAND

ELECTRICAL CONDUCTOR PREPARATION

No Drawing. Application filed October 29, 1928, Serial No. 315,894, and in Great Britain December 21, 1927.

This invention relates to improvements in the preparation of electrically conducting coating compositions.

Various electrical conducting coating preparations are already known for coating the surfaces of non-metallic articles prior to electro-deposition of a metallic layer thereon.

Mixtures of graphite, soot, carbon or of metallic powders with varnishes, lacquers or liquids containing resins, oils and the like, are poor conductors of electricity, require great care in applying them to the article and in the subsequent handling of the latter. Moreover, several operations are involved such as heating, drying and so on, and finally they have a poor jointing action as they are not sufficiently elastic to allow for the difference in expansion between the surface of the article and the metallic layer without, the latter becoming loose or cracking.

Preparations comprising mixtures of a soluble varnish and carbon, soot or graphite, previously prepared for this purpose, do not form homogeneous mixtures, particularly owing to the differences of density of the materials, and consequently it is difficult to obtain smooth coatings with them.

One object of the present invention is to remedy the above mentioned inconveniences.

According to the invention a process for preparing an electrically conducting coating composition comprises mixing fine purified powdered carbon with a volatile liquid soluble in water and having a lower boiling point than water, adding water, boiling until complete evaporation of the volatile liquid is produced, and mixing the water and carbon remaining with water glass. Thus, the invention depends on a particular method of mixing the ingredients, whereby the carbon is first uniformly wetted by a liquid miscible with water. In this way a homogeneous suspension of carbon in water glass is ultimately obtained.

Carbon, soot or synthetic graphite in powdered form is purified by known chemical operations and reduced to an impalpable powder.

To the powder thus obtained ethyl alcohol of 30 to 40% strength, or another alcohol or ether, is added, so as to obtain a syrupy paste which is then boiled for between one quarter and one half of an hour. The mixture is constantly stirred and small quantities of water are added thereto at intervals until complete evaporation of the alcohol, or other volatile liquid has occurred.

The effect of first mixing the powdered carbon with a volatile liquid is to maintain the particles of powder loose, prevent the subsequent formation of lumps, and ultimately obtain a good bonding agent of homogeneous character.

The preparation thus obtained is preferably heated before use.

Having described my invention what I claim as new and desire to secure by Letters Patent is:

1. A process for preparing an electrically conducting coating composition suitable for covering non-metallic articles which comprises mixing fine purified powdered carbon with a volatile liquid soluble in water and having a lower boiling point than water, adding water, boiling until complete evaporation of the volatile liquid is produced, and mixing the water and carbon remaining with water glass.

2. A process for preparing an electrically conducting coating composition as set forth in claim 1 in which the mixture is reheated that is finally obtained.

3. A process for preparing an electrically conducting coating composition as set forth in claim 1 in which the volatile liquid is a low boiling alcohol.

4. A process for preparing an electrically conducting coating composition as claimed in claim 3 wherein the low boiling point alcohol is ethyl alcohol.

5. A process for preparing an electrically conducting coating composition which comprises mixing finely divided graphitic particles with a liquid soluble in water and having a lower boiling point than water evaporating said volatile liquid and gradually adding water during evaporation, and thereafter adding water-glass whereby a uniform aqueous suspension of the graphitic particles in the water-glass is obtained.

In testimony whereof I hereunto affix my signature.

KAZIMIERZ BARANOWSKI.